United States Patent
Galati et al.

(10) Patent No.: US 9,321,205 B2
(45) Date of Patent: Apr. 26, 2016

(54) VALVE PIN ROTATION LIMITER

(71) Applicant: Synventive Molding Solutions, Inc., Peabody, MA (US)

(72) Inventors: Vito Galati, Rowley, MA (US); Zhuang Rui Tan, Peabody, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 0 days.

(21) Appl. No.: 14/666,625

(22) Filed: Mar. 24, 2015

(65) Prior Publication Data

US 2015/0197050 A1 Jul. 16, 2015

Related U.S. Application Data

(63) Continuation of application No. PCT/US2013/061957, filed on Sep. 26, 2013.

(60) Provisional application No. 61/705,826, filed on Sep. 26, 2012.

(51) Int. Cl.
*B29C 45/20* (2006.01)
*B29C 45/28* (2006.01)
*B29C 45/23* (2006.01)

(52) U.S. Cl.
CPC ........... *B29C 45/2806* (2013.01); *B29C 45/231* (2013.01); *B29C 2045/2875* (2013.01)

(58) Field of Classification Search
CPC .............. B29C 45/231; B29C 45/2806; B29C 2045/2875
See application file for complete search history.

(56) References Cited

U.S. PATENT DOCUMENTS

| 6,599,116 B2 | 7/2003 | Lee et al. |
| 2009/0104307 A1 | 4/2009 | Ten et al. |
| 2010/0285170 A1 | 11/2010 | Galati et al. |
| 2012/0251657 A1* | 10/2012 | Adas ................. B29C 45/27 425/569 |

FOREIGN PATENT DOCUMENTS

| CA | 1032317 A1 | 6/1978 |
| CN | 201950779 | 8/2011 |
| DE | 2660024 C2 | 1/1983 |

OTHER PUBLICATIONS

Written Opinion of the IPEA mailed Jan. 8, 2014 in International Application No. PCT/US2013/061957.
Int'l Preliminary Report on Patentability mailed Sep. 1, 2015 in International Application No. PCT/US2013/061957.

* cited by examiner

*Primary Examiner* — Jill Heitbrink
(74) *Attorney, Agent, or Firm* — M. Lawrence Oliverio

(57) ABSTRACT

Injection machine and fluid distribution system having a valve pin reciprocally movable along its longitudinal axis between upstream and downstream (axial) positions, including a valve pin rotation limiter for resisting or preventing rotation of the valve pin around its axis. The limiter includes an elongated rail having a rail axis, stationarily mounted relative to an actuator that drives the valve pin upstream-downstream along its longitudinal axis wherein the rail axis is radially spaced from the valve pin axis. A finger projects between the rail and the valve pin, having a first end mounted on or to one of the rail and the valve pin, and a second end slidably engaged against a receiving surface of the other of the rail or valve pin, wherein such engagement is adapted to resist or prevent rotation of the valve pin.

33 Claims, 6 Drawing Sheets

VALVE PIN ROTATION LIMITER

RELATED APPLICATIONS

This application is a continuation of and claims the benefit of priority to international application no. PCT/US13/61957 filed Sep. 26, 2013 the disclosure of which is incorporated herein in its entirety as if fully set forth herein.

The disclosures of all of the following are incorporated by reference in their entirety as if fully set forth herein: U.S. Pat. Nos. 5,894,025, 6,062,840, 6,294,122, 6,309,208, 6,287,107, 6,343,921, 6,343,922, 6,254,377, 6,261,075, 6,361,300 (7006), U.S. Pat. Nos. 6,419,870, 6,464,909 (7031), U.S. Pat. Nos. 6,599,116, 6,824,379, 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. Pat. Nos. 6,005,013, 6,051,1748, 091,202 (7097U50), U.S. Patent application publication no. 20020147244, U.S. patent application Ser. No. 10/269,927 filed Oct. 11, 2002 (7031), U.S. application Ser. No. 09/503,832 filed Feb, 15, 2000 (7053), U.S. application Ser. No. 09/656,846 filed Sep. 7, 2000 (7060), U.S. application Ser. No. 10/006,504 filed Dec. 3, 2001, (7068) and U.S. application Ser. No. 12/614,604 filed Nov. 9, 2009 (7087US1), U.S. application Ser. No. 10/101,278 filed Mar., 19, 2002 (7070) and U.S. application Ser. No. 13/484,336 filed May 31, 2012 (7100US1) and U.S. application Ser. No. 13/484,408 filed May 31, 2012 (7100U53).

BACKGROUND OF THE INVENTION

Systems for preventing a valve pin from rotating around its axis in an injection molding apparatus have been developed such that the valve pin is provided with a head that fits into an adapter such that the head cannot rotate within the adapter thus preventing the pin from rotating.

SUMMARY OF THE INVENTION

In accordance with one embodiment of the invention there is provided an injection molding system comprising:
  an injection machine and a fluid distribution system that injects a heated fluid material through an upstream end of a fluid delivery channel towards a downstream end of the fluid delivery channel towards a gate to a cavity of a mold;
  an elongated valve pin having a longitudinal axis and a proximal end interconnected to an actuator that is controllably drivable to move the pin back and forth along its longitudinal axis between one or more upstream axial positions and one or more downstream axial positions;
  an elongated rail having a rail axis, the rail being stationarily mounted relative to the actuator such that the rail axis is radially spaced apart from the axis of the valve pin;
  a finger projecting between the rail and the valve pin, the finger having a first end mounted on or to one of the rail or the valve pin and a second end slidably engaged against a receiving surface of the other of the rail or the valve pin;
  wherein the second end of the finger and the receiving surface against which the second end of the finger is engaged are adapted to resist or prevent rotation of the valve pin around the axis of the valve pin.

In one embodiment, the second end of the finger is slidably engaged with the receiving surface such that the valve pin is movable back and forth along its longitudinal axis while the second end of the finger slides along the receiving surface of the valve pin or the rail.

In one embodiment, the first end of the finger is slidably mounted on or to the rail and the second end of the finger is slidably engaged against the receiving surface of the valve pin.

In one embodiment, the first end of the finger comprises a base portion mounted on or to the rail and the second end of the finger comprises a projection portion having a terminal end, the projection portion being attached to the base portion and projecting radially inward toward the longitudinal axis of the valve pin such that the terminal end of the projection portion slidably engages the receiving surface of the valve pin.

In one embodiment, the base portion is slidably mounted on or to the rail for slidable movement along the axis of the rail.

In one embodiment, the receiving surface of the valve pin comprises a flat on a radially outward surface of the valve pin, and the second end of the finger is slidably engaged against the flat on the radially outward surface of the valve pin.

In one embodiment, the receiving surface of the valve pin comprises a flat on a radially outward surface of the valve pin, the terminal end of the projection engaging the flat of the valve pin.

In one embodiment, the terminal end of the projection comprises a flat that is complementary to the flat of the valve pin.

In one embodiment, the first end of the finger is mounted on or to the valve pin and the second end of the finger is slidably engaged against the receiving surface of the rail.

In one embodiment, the rail has an axially extending slot formed by opposing edge surfaces, the second end of the finger projecting radially outwardly from the longitudinal axis of the valve pin and radially into the slot and slidably engages the opposing edge surfaces.

In another aspect of the invention there is provided a method of limiting or preventing rotation of a valve pin in an injection molding apparatus comprising an injection machine that injects a heated fluid material through an upstream end of a fluid delivery channel towards a downstream end of the fluid delivery channel towards a gate to a cavity of a mold, the method comprising:
  providing an elongated valve pin having a longitudinal axis and a proximal end interconnected to an actuator that is controllably drivable to move the pin back and forth along its longitudinal axis between one or more upstream axial positions and one or more downstream axial positions;
  providing an elongated rail having a rail axis, the rail being stationarily mounted relative to the actuator such that the rail axis is radially spaced apart from the longitudinal axis of the valve pin;
  providing a finger projecting between the rail and the valve pin, the finger having a first end mounted on or to one of the rail or the valve pin and a second end slidably engaged against a receiving surface of the other of the rail or the valve pin;
  the second end of the finger and the receiving surface against which the second end of the finger is engaged being adapted to resist or prevent rotation of the valve pin around the axis of the valve pin; and
  moving the valve pin between upstream and downstream positions wherein the second end of the finger and receiving surface are engaged with each other to resist or prevent rotation of the valve pin around its longitudinal axis.

There is also provided in accordance with one embodiment the invention an apparatus for limiting rotation of a valve pin in an injection molding system comprised of an injection machine that injects a heated fluid material through an upstream end of a fluid delivery channel towards a downstream end of the fluid delivery channel towards a gate to a cavity of a mold, the apparatus comprising:

an elongated valve pin having a longitudinal axis and a proximal end interconnected to an actuator that is controllably drivable to move the pin back and forth along its longitudinal axis between one or more upstream axial positions and one or more downstream axial positions;

an elongated rail having a rail axis, the rail being stationarily mounted relative to the actuator such that the rail axis is radially spaced apart from the axis of the valve pin;

a finger projecting between the rail and the valve pin, the finger having a first end mounted on or to one of the rail or the valve pin and a second end slidably engaged against a receiving surface of the other of the rail or the valve pin;

wherein the second end of the finger and the receiving surface against which the second end of the finger is engaged are adapted to resist or prevent rotation of the valve pin around the axis of the valve pin.

In one embodiment, the system includes a coupler attached to a drive shaft of the actuator that controllably drives the valve pin along its longitudinal axis, the coupler having a recess shaped to retain a portion of the valve pin in the recess while the actuator drives the valve pin, and the recess having an open receiving portion allowing the valve pin portion to slide radially in and out of the recess in the coupler.

In one embodiment, the pin portion comprises a head of the valve pin.

In one embodiment, the fluid distribution system includes a top clamp plate, a mold and a manifold, the top clamp plate being interconnected to the mold and the manifold being mounted to the top clamp plate and the mold.

In one embodiment, the actuator is mounted in a recess disposed within the top clamp plate and the actuator is radially slidable with respect to the top clamp plate in the recess.

In one embodiment, the manifold is mounted such that it is radially slidable with respect to the top clamp plate.

In one embodiment, the top clamp plate is fixedly interconnected to the mold.

In one embodiment, the fluid distribution system includes a manifold, and the valve pin is slidably disposed within a fluid delivery channel disposed within the manifold.

In one embodiment, the valve pin has a shaft disposed in the fluid delivery channel of the manifold and a head disposed in a recess of a coupler attached to a drive shaft of the actuator.

In one embodiment, the rail is fixedly interconnected to the manifold.

BRIEF DESCRIPTION OF THE DRAWINGS

The above and further advantages of the invention may be better understood by referring to the following description in conjunction with the accompanying drawings in which.

DETAILED DESCRIPTION

Figure 1:
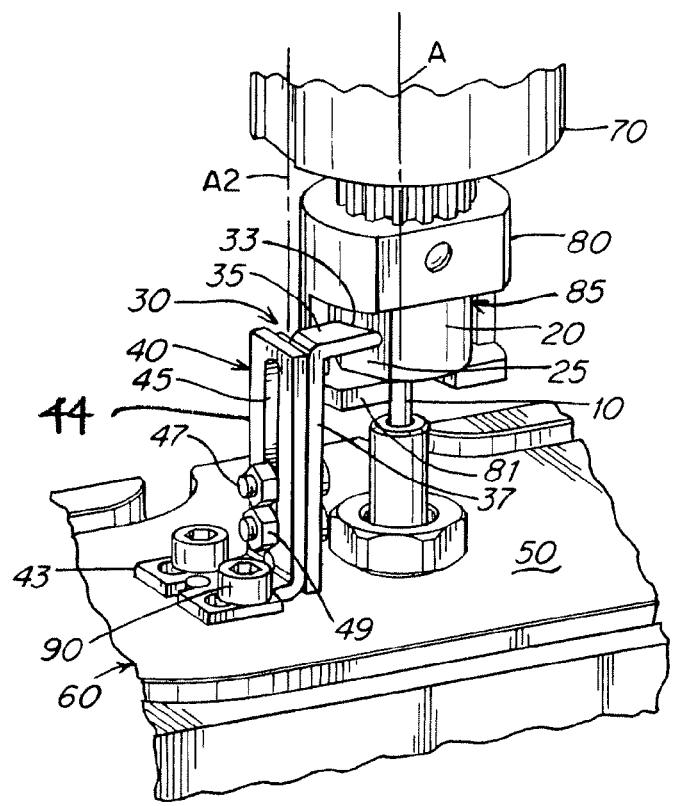
FIG. 1 is a top perspective view of one embodiment of the invention showing a finger slidably mounted on a rail with the finger engaging a complementary flat surface on the head of a valve pin to prevent rotation of the valve pin.
Figure 2:
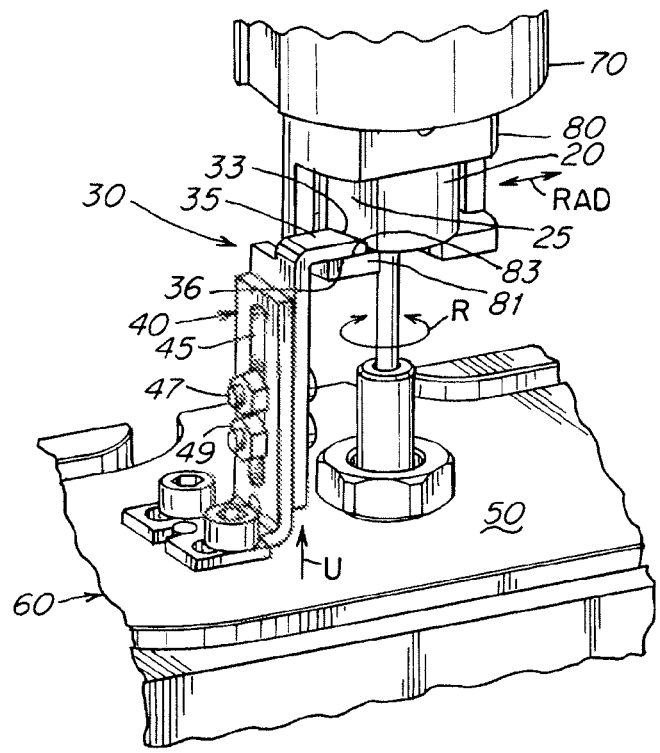
FIG. 2 is a sequential view similar to FIG. 1 showing the valve pin in an upstream position relative to the position of FIG. 1.

FIGS. 1-2 show a valve pin 10 having a head 20 inserted within a receiving recess 85 of a coupler 80 attached to the drive shaft of an actuator 70 that controllably drives the valve pin along a reciprocal back and forth axial path of travel A along the longitudinal axis A of the valve pin 10. The head 20 of the valve pin 10 has a generally cylindrical radially outer surface, but includes a flat radially outer surface portion 25 that is complementary to the end surface 33 of a radial projection 35 that forms a portion of a finger 30. The finger has a base portion 37 attached to the projection portion 35, the base portion 37 being slidably mounted to a guide or support rail 40. The support rail is mounted along a rail axis A2 that is aligned relative to vale pin axis A to enable the finger to slide back and forth or upstream and downstream together with the back and forth movement of the valve pin 10, head 20 and coupler 80 which are collectively driven along axis A by the actuator 70.

As shown in FIGS. 1, 2, the guide rail 40 is stationarily mounted relative to the actuator to the top surface 50 of a plate 60 which in the embodiment shown is a heated fluid distribution manifold or hotrunner 60. The stationary mounting of the guide rail 40 is enabled by providing the rail 40 with flanged feet 43 that are bolted into the body of the plate 60 on the top surface 50 of the plate 60. The guide rail has an elongated body portion 44 substantially parallel to axis A and transverse to the top surface 50 of plate 60. The body portion 44 has an elongated slot 45 through which bolts 47 extend, the bolts 47 connecting the base portion 37 of the finger 30 to the body portion 44 of rail 40. The bolts 47 are inserted through complementary receiving apertures in the body of the base portion 37 such that the bolts 47 follow any upstream or downstream movement of the finger base portion 37. The bolts 47 and the slot 45 and the nuts 49 are all adapted to enable the bolts 47 to slide in an upstream-downstream direction that is generally parallel to the axes A and A2 such that the finger 30 and its projection portion 35 can move back and forth in upstream-downstream manner together with upstream-downstream movement of the pin 10 and pin head 20. As shown in FIG. 2 when the pin 10 and coupler 80 are moved far enough in the upstream direction U, an undersurface 36 of the finger projection portion 35 will engage an upper facing surface 83 of a portion 81 of the pin head coupler 80. Engagement of the surfaces 36 and 81 causes the finger 30 to move upstream U against the force of gravity together with upstream movement of the coupler 80 with the end surface 33 of the projection portion 35 remaining slidably engaged with the complementary flat surface 25 of the pin head 20.

The finger 30 is mounted to the stationarily mounted rail 40 in a manner such that the finger 30 is prevented from rotating around any up-down axis. As can be readily imagined the engagement of the end surface 33 of the non-rotatable finger 30 with the complementarily shaped surface 25 of the head 20 acts to limit or prevent rotation R of the valve pin 10 by virtue of its rigid interconnection to the non-rotatable head 20. Thus the axially slidable finger 30 follows the upstream-downstream movement of the pin head 20 and surface 25 to prevent the pin head 20 and its attached valve pin 10 from rotating.

FIGS. 3-11 show an alternative embodiment where the anti-rotation finger 30 is a radial projection comprising a rod or pin 30 that has a proximal end that is inserted and stationarily mounted within a complementary receiving aperture 27 that is drilled into the head 20 of the valve pin 10. The finger pin 30 is configured and adapted to project radially outwardly RAD toward and through a complementary guide slot 45 that is axially disposed and arranged within the body 44 of guide rail 40 that is stationarily mounted on the top surface 50 of a hotrunner plate 60. The guide rail 40 is stationary against rotative movement. Thus the finger pin 30 is prevented from rotating and the head 20 is prevented from rotating R around the axis A of the valve pin 10 by virtue of the connection of the finger pin 30 to the head 20. As can be readily imagined the finger pin 30 has an outer surface configuration that is complementary to the inner opposing surfaces 45a, 45b of the slot 45 such that the outer surface 39 of the pin 30 slidably engages surfaces 45a, 45b. As head 20 is driven in an upstream-downstream direction A, finger pin 30 follows the driven movement of the head 20, the distal end 38 of the finger pin 30 being concomitantly driven together with the valve pin head 20 in an upstream-downstream direction A3 through the axially aligned and extending slot 45, the outside surface 39 of the finger pin 30 sliding along surfaces 45a, 45b as the pin moves axially up and down A3. In the FIGS. 3-4 embodiment, the guide rail 40 is mounted and arranged such that the slot 45 is disposed to the lateral side of the receiving aperture 85 of the pin head coupler 80. In the FIGS. 5-11 embodiment, described below, the guide rail 40 is mounted and arranged such that the guide slot 45 is disposed in the front of the receiving aperture 85.

As can be readily imagined, the pin head coupler 80 is fixedly attached to the drive shaft of the actuator 70 and travels and follows the upstream-down A movement of the controllably drivable drive shaft of the actuator 70.

Figure 3:
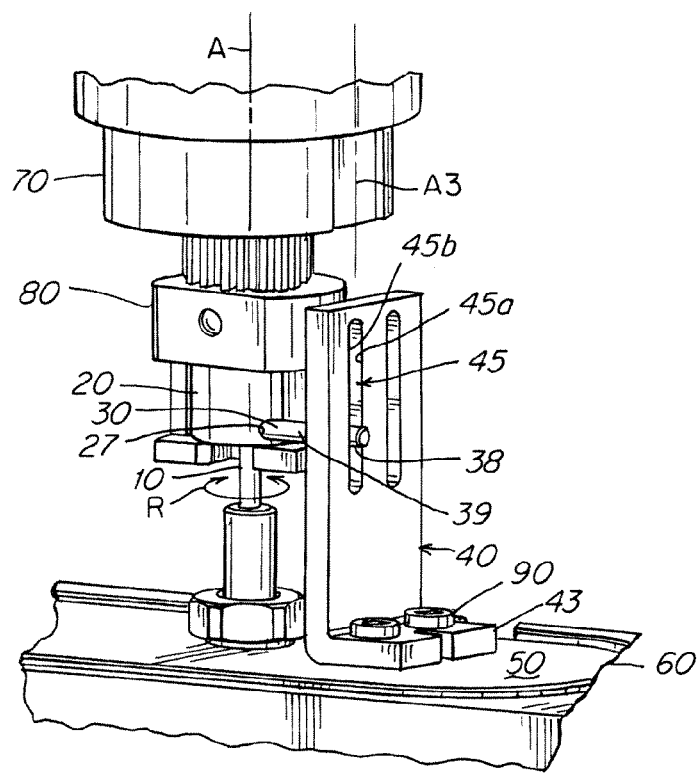
FIG. 3 is a side perspective view of another embodiment of the invention showing a finger comprised of a slide pin mounted in an aperture drilled in the head of a valve pin with a distal end of the pin being disposed in a guide slot of a rail to prevent rotation of the valve pin.
Figure 4:
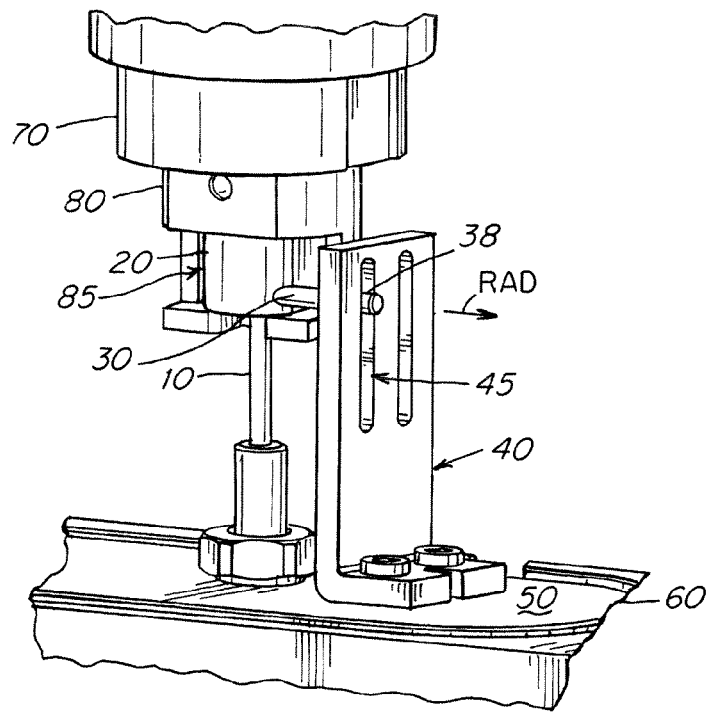
FIG. 4 is a sequential view similar to FIG. 3 showing the valve pin in an upstream position relative to the position of FIG. 3.

A third embodiment is illustrated in FIGS. 5-11. This embodiment is substantially similar to the second embodiment of FIGS. 3-4 wherein the anti-rotation finger 30 is a radial projection stationarily mounted to the head 20 of the valve pin. However, the finger pin 30 is mounted to the head 20 at a different location in the two embodiments. In FIGS. 3-4, the finger pin 30 is offset-mounted radially (laterally) from the pin head axis A, i.e., the pin extends tangentially from the outer cylindrical surface of the pin head. As a result, the guide rail 40 is mounted such that the slot 45 is disposed to the lateral side of the receiving aperture 85 of the pin head coupler 80. In contrast, in the embodiment FIGS. 5-11, the finger pin 30 extends radially (transversely) from the central axis A of the pin head 20, and as a result the guide rail 40 is mounted such that the guide slot 45 is disposed in front of the receiving aperture 85 of the pin head coupler 80. This difference in lateral positioning of the finger pin with respect to the pin axis allows for alternative structural arrangements between the adjacent components such the positioning of the rail 40 on the top surface 50 of the manifold 60 or the positioning of the actuator 70 and coupler 80.

Another difference in the embodiment of FIGS. 5-11 is that the slot 45 is open-ended at the top end, enabling the distal end 38 of the finger pin 30 to be readily moved in and out of the slot 45 along the rail axis A3. The open end of the slot has an enlarged (flared) opening to facilitate positioning of the distal end of the finger pin in the slot 45.

Figure 5:
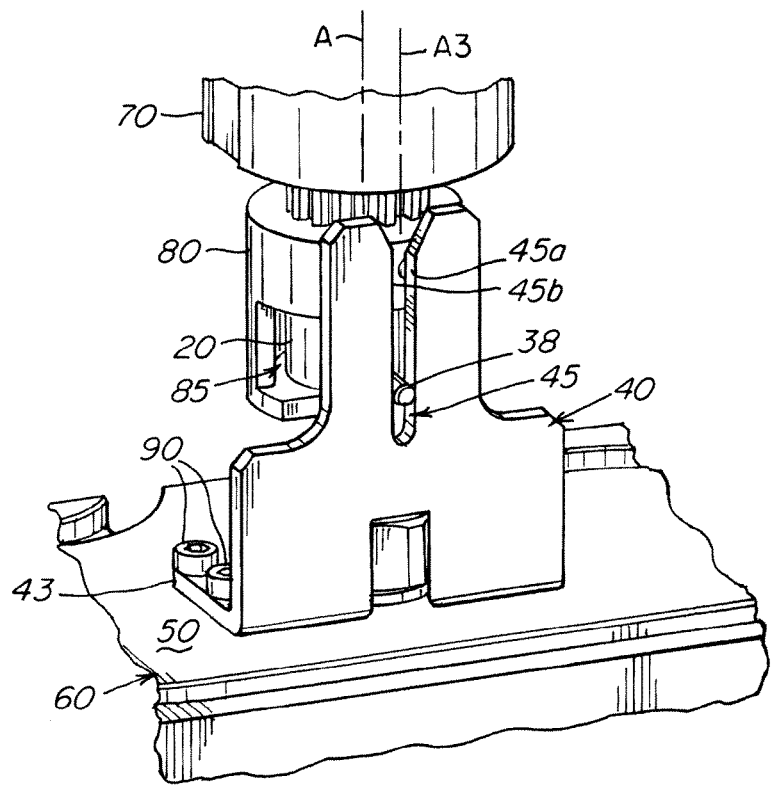
FIG. 5 is a perspective top view of another embodiment of the invention similar to the FIG. 3 apparatus showing a modified guide rail having a single open-ended slot.
Figure 6:
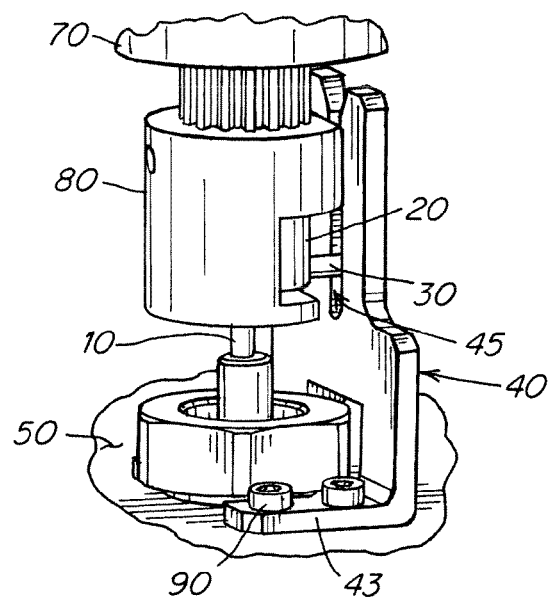
FIG. 6 is a side perspective view of the FIG. 5 apparatus showing the valve pin in a downstream position.
Figure 7:
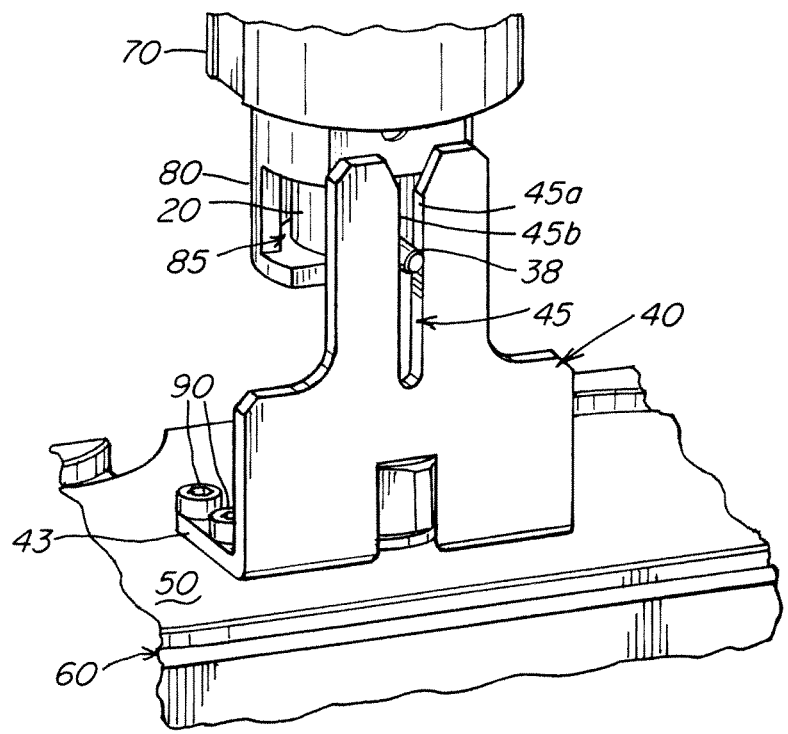
FIG. 7 is a view similar to FIG. 5 showing the valve pin in an upstream position.
Figure 8:
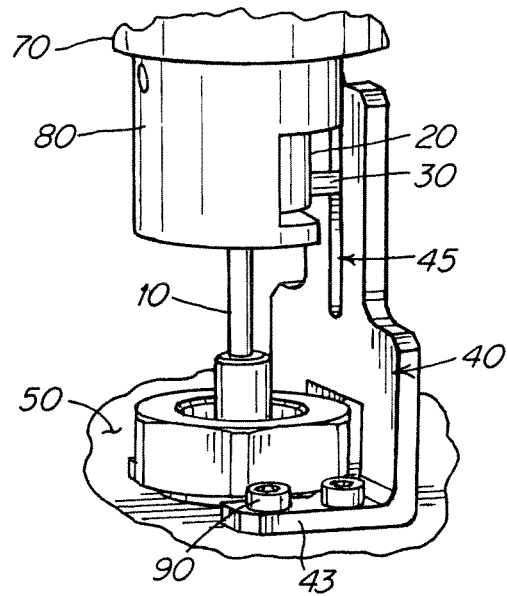
FIG. 8 is a side perspective view of the FIG. 7 apparatus.

FIGS. 5-8 are different perspective views of the same apparatus. In FIGS. 5-6 the finger pin 30 is in a relatively downstream position, and in FIGS. 7-8 in a relatively upstream position.

Figure 9:
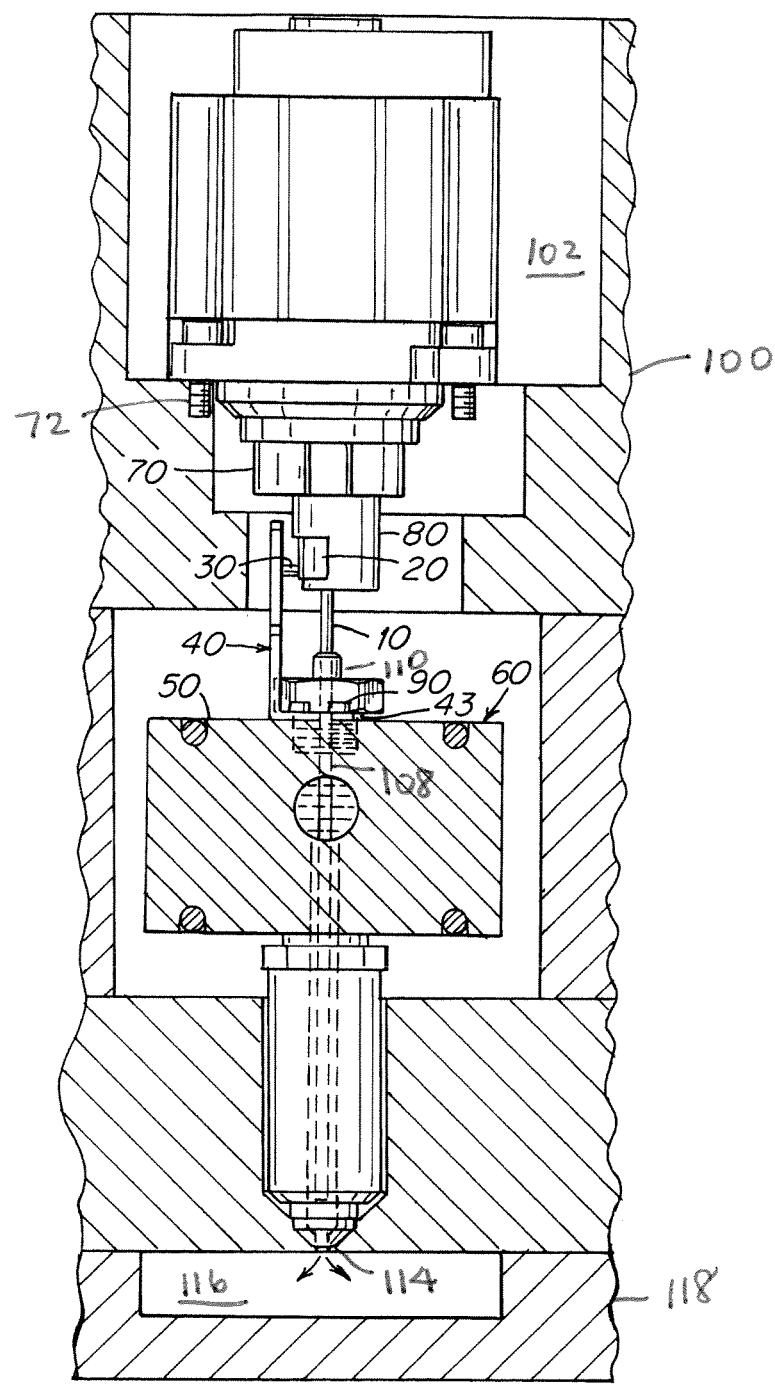
FIG. 9 is a side view of the FIG. 5 apparatus disposed in a fluid distribution system including a top clamp plate, a manifold, and a mold, wherein the valve pin is disposed in a fluid delivery channel in the manifold, and the actuator is disposed in a recess in the top clamp plate.
Figure 10:
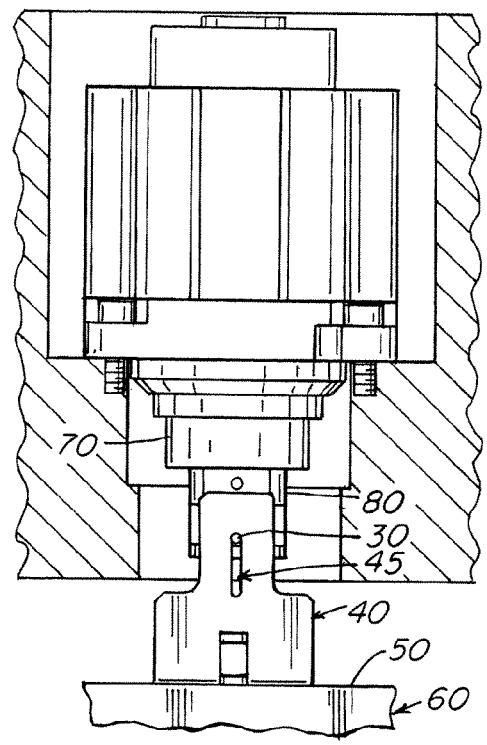
FIG. 10 is a front view of the top clamp plate and actuator portion of the FIG. 9 apparatus.
Figure 11:
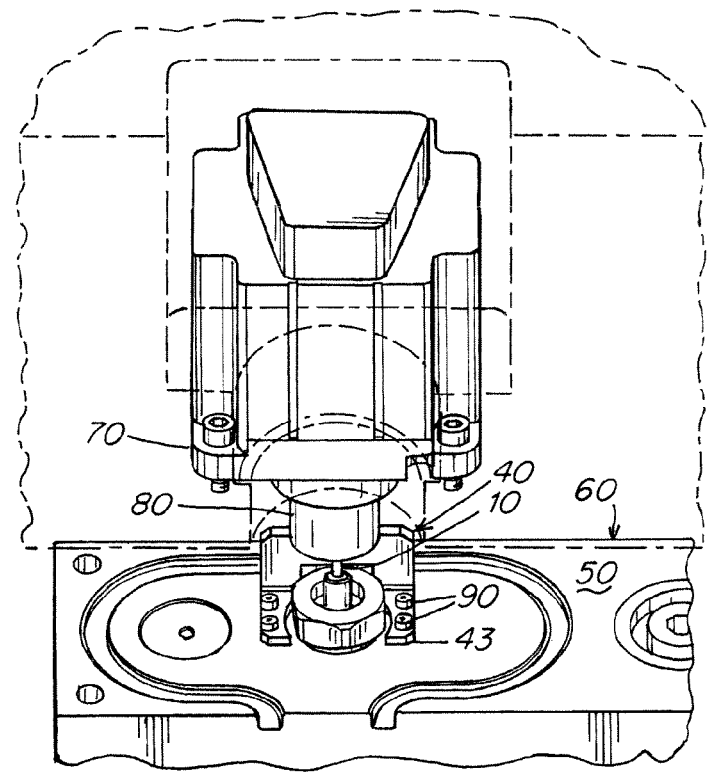
FIG. 11 is a top rear perspective view of the top clamp plate and actuator portion of the FIG. 9 apparatus.

FIG. 9 illustrates the apparatus of FIG. 5 disposed in one embodiment of a fluid distribution system, including a top clamp plate 100, manifold 60 and mold 118. The top clamp plate is interconnected to the mold, and the manifold is mounted to and between the clamp plate and the mold. The top clamp plate has a recess 102, extending completely through the thickness of the clamp plate 100, in which the actuator 70, coupler 80 and pin head 20 are disposed. The top clamp plate 100 is spaced apart and disposed substantially parallel to the top surface of the manifold 60.

This embodiment illustrates a mounting of the top plate and manifold in a manner that enables ready coupling and de-coupling of the valve pin and coupler without requiring disassembly of the top clamp plate from the manifold. The actuator 70 is mounted with bolts 72 in the recess 102 of the top clamp plate 100. When the bolts are removed, the actuator can be moved radially within the recess 102 of the top clamp plate, allowing the pin head 20 be radially moved out of the receiving aperture 85 of the coupler 80, thus de-coupling the valve pin from the coupler. With the pin head now located outside the coupler 80, the valve pin can be readily replaced. The actuator 70 (with a new valve pin) can then be moved back (radially) to its original position and bolted to the top clamp plate.

FIG. 9 also shows a fluid delivery channel 108 in the manifold 60, wherein the valve pin 10 is slidably disposed within the fluid delivery channel disposed within the manifold. The valve pin has a shaft 10 that is mounted within and extends through a bushing 110 and mounting aperture in the manifold. The downstream distal end of the fluid channel 108 has a gate 114 that communicates with a cavity 116 of a mold 118. The pin shaft 10 is adapted to be disposed and driven reciprocally UD within the fluid delivery channel 108 that contains and routes pressurized fluid material into the channel from an injection machine. The drive shaft of a motor or actuator comprises a screw which is directly connected at its downstream end with the upstream (proximal) end of the valve pin, to drive the valve pin in the axial direction. The proximal end of the valve pin can be connected to and driven by the drive shaft of an actuator in variety of ways. For example, the drive shaft of the actuator can be driven by an electric motor.

These and other embodiments of the invention will be apparent to the skilled person and are within the scope of the present invention as set forth in the appended claims.

The invention claimed is:

1. An injection molding system comprising:
   an injection machine and a fluid distribution system that injects a heated fluid material through an upstream end of a fluid delivery channel towards a downstream end of the fluid delivery channel towards a gate to a cavity of a mold;
   an elongated valve pin having a longitudinal axis and a proximal end interconnected to an actuator that is controllably drivable to move the pin back and forth along its longitudinal axis between one or more upstream axial positions and one or more downstream axial positions;
   an elongated rail having a rail axis, the rail being stationarily mounted relative to the actuator such that the rail axis is radially spaced apart from the axis of the valve pin;
   a finger projecting between the rail and the valve pin, the finger having a first end mounted on or to one of the rail or the valve pin and a second end slidably engaged against a receiving surface of the other of the rail or the valve pin;
   wherein the second end of the finger and the receiving surface against which the second end of the finger is engaged are adapted to resist or prevent rotation of the valve pin around the axis of the valve pin.

2. The apparatus of claim 1 wherein the second end of the finger is slidably engaged with the receiving surface such that the valve pin is movable back and forth along its longitudinal axis while the second end of the finger slides along the receiving surface of the valve pin or the rail.

3. The apparatus of claim 2 wherein the first end of the finger is slidably mounted on or to the rail and the second end of the finger is slidably engaged against the receiving surface of the valve pin.

4. The apparatus of claim 3 wherein the first end of the finger comprises a base portion mounted on or to the rail and the second end of the finger comprises a projection portion having a terminal end, the projection portion being attached to the base portion and projecting radially inward toward the longitudinal axis of the valve pin such that the terminal end of the projection portion slidably engages the receiving surface of the valve pin.

5. The apparatus of claim 4 wherein the base portion is slidably mounted or to on the rail for slidable movement along the axis of the rail.

6. The apparatus of claim 3 wherein the receiving surface of the valve pin comprises a flat on a radially outward surface of the valve pin, the second end of the finger being slidably engaged against the flat on the radially outward surface of the valve pin.

7. The apparatus of claim 4 wherein the receiving surface of the valve pin comprises a flat on a radially outward surface of the valve pin, the terminal end of the projection portion engaging the flat of the valve pin.

8. The apparatus of claim 7 wherein the terminal end of the projection portion comprises a flat that is complementary to the flat of the valve pin.

9. The apparatus of claim 2 wherein the first end of the finger is mounted on or to the valve pin and the second end of the finger is slidably engaged against the receiving surface of the rail.

10. The apparatus of claim 9 wherein the rail has an axially extending slot formed by opposing edge surfaces, the second end of the finger projecting radially outwardly from the longitudinal axis of the valve pin and into the slot, the second end of the finger and the slot being adapted such that the second end of the finger projects radially into the slot and slidably engages the opposing edge surfaces.

11. Method of limiting or preventing rotation of a valve pin in an injection molding apparatus comprising an injection machine that injects a heated fluid material through an upstream end of a fluid delivery channel towards a downstream end of the fluid delivery channel towards a gate to a cavity of a mold, the method comprising:
   providing an elongated valve pin having a longitudinal axis and a proximal end interconnected the proximal end of the valve pin to an actuator that is controllably drivable to move the pin back and forth along its longitudinal axis between one or more upstream axial positions and one or more downstream axial positions;
   providing an elongated rail having a rail axis, the rail being stationarily mounted relative to the actuator such that the rail axis is radially spaced apart from the longitudinal axis of the valve pin;
   providing a finger projecting between the rail and the valve pin, the finger having a first end mounted on or to one of the rail or the valve pin and a second end slidably engaged against a receiving surface of the other of the rail or the valve pin;
   the second end of the finger and the receiving surface against which the second end of the finger is engaged being adapted to resist or prevent rotation of the valve pin around the axis of the valve pin; and
   moving the valve pin between upstream and downstream positions while the second end of the finger and receiving surface engage each other to resist or prevent rotation of the valve pin.

12. Apparatus for limiting rotation of a valve pin in an injection molding system comprised of an injection machine and a fluid distribution system that injects a heated fluid material through an upstream end of a fluid delivery channel towards a downstream end of the fluid delivery channel towards a gate to a cavity of a mold, the apparatus comprising:
   an elongated valve pin having a longitudinal axis and a proximal end interconnected to an actuator that is controllably drivable to move the pin back and forth along its longitudinal axis between one or more upstream axial positions and one or more downstream axial positions;
   an elongated rail having a rail axis, the rail being stationarily mounted relative to the actuator such that the rail axis is radially spaced apart from the axis of the valve pin;
   a finger projecting between the rail and the valve pin, the finger having a first end mounted on or to one of the rail or the valve pin and a second end slidably engaged against a receiving surface of the other of the rail or the valve pin;
   wherein the second end of the finger and the receiving surface against which the second end of the finger is engaged are adapted to resist or prevent rotation of the valve pin around the axis of the valve pin.

13. The apparatus of claim 12 including a coupler attached to a drive shaft of the actuator that controllably drives the valve pin along its longitudinal axis, the coupler having a recess shaped to retain a portion of the valve pin in the recess while the actuator drives the valve pin, and the recess having an open receiving aperture allowing the valve pin portion to slide radially in and out of the recess in the coupler.

14. The apparatus of claim 13 wherein the pin portion comprises a head of the valve pin.

15. The apparatus of claim 1 or 12 wherein the fluid distribution system includes a top clamp plate, a mold and a manifold, the top clamp plate being interconnected to the mold and the manifold being mounted to the top clamp plate and the mold.

16. The apparatus of claim 15 wherein the actuator is mounted in a recess disposed within the top clamp plate and the actuator is radially slidable with respect to the top clamp plate in the recess.

17. The apparatus of claim 15 wherein the manifold is mounted such that it is radially slidable with respect to the top clamp plate.

18. The apparatus of claim 15 wherein the top clamp plate is fixedly interconnected to the mold.

19. The apparatus of claim 1 or 12, wherein the fluid distribution system includes a manifold, and the valve pin is slidably disposed within a fluid delivery channel disposed within the manifold.

20. They apparatus of claim 19 wherein the valve pin has a shaft disposed in the fluid delivery channel of the manifold and a head disposed in a recess of a coupler attached to a drive shaft of the actuator.

21. The apparatus of claim 19 wherein the rail is fixedly interconnected to the manifold.

22. Method of performing an injection cycle comprising injecting the heated fluid material through the manifold of an apparatus according to claim 12 and operating the actuator of the apparatus of claim 12 to drive the valve pin with the finger projecting between the valve pin the rail during the course of performance of the injection cycle.

23. An injection molding system comprising:
an injection machine and a fluid distribution system that injects a heated fluid material through an upstream end of a fluid delivery channel towards a downstream end of the fluid delivery channel towards a gate to a cavity of a mold;
an elongated valve pin having a longitudinal axis and a proximal end interconnected to an actuator comprised of an electric motor having a shaft that is controllably drivable to move the pin back and forth along its longitudinal axis between one or more upstream axial positions and one or more downstream axial positions;
an elongated rail having a rail axis, the rail being stationarily mounted relative to the actuator such that the rail axis is radially spaced apart from the axis of the valve pin;
a finger projecting between the rail and the valve pin, the finger having a first end mounted on or to one of the rail or the valve pin and a second end slidably engaged against a receiving surface of the other of the rail or the valve pin;
wherein the second end of the finger and the receiving surface against which the second end of the finger is engaged are adapted to resist or prevent rotation of the valve pin around the axis of the valve pin.

24. The system of claim 23 wherein the second end of the finger is slidably engaged with the receiving surface such that the valve pin is movable back and forth along its longitudinal axis while the second end of the finger slides along the receiving surface of the valve pin or the rail.

25. The system of claim 24 wherein the first end of the finger is slidably mounted on or to the rail and the second end of the finger is slidably engaged against the receiving surface of the valve pin.

26. The system of claim 25 wherein the first end of the finger comprises a base portion mounted on or to the rail and the second end of the finger comprises a projection portion having a terminal end, the projection portion being attached to the base portion and projecting radially inward toward the longitudinal axis of the valve pin such that the terminal end of the projection portion slidably engages the receiving surface of the valve pin.

27. The system of claim 26 wherein the base portion is slidably mounted or to on the rail for slidable movement along the axis of the rail.

28. The system of claim 25 wherein the receiving surface of the valve pin comprises a flat on a radially outward surface of the valve pin, the second end of the finger being slidably engaged against the flat on the radially outward surface of the valve pin.

29. The system of claim 26 wherein the receiving surface of the valve pin comprises a flat on a radially outward surface of the valve pin, the terminal end of the projection portion engaging the flat of the valve pin.

30. The system of claim 29 wherein the terminal end of the projection portion comprises a flat that is complementary to the flat of the valve pin.

31. The system of claim 24 wherein the first end of the finger is mounted on or to the valve pin and the second end of the finger is slidably engaged against the receiving surface of the rail.

32. The system of claim 31 wherein the rail has an axially extending slot formed by opposing edge surfaces, the second end of the finger projecting radially outwardly from the longitudinal axis of the valve pin and into the slot, the second end of the finger and the slot being adapted such that the second end of the finger projects radially into the slot and slidably engages the opposing edge surfaces.

33. Method of performing an injection cycle comprising injecting the heated fluid material through the manifold of a system according to claim 23 and operating the actuator of the system of claim 23 to drive the valve pin with the finger projecting between the valve pin the rail during the course of performance of the injection cycle.

* * * * *